United States Patent [19]

Icking et al.

[11] Patent Number: 4,702,197
[45] Date of Patent: Oct. 27, 1987

[54] DEVICE FOR CLEANING A MILKING SYSTEM

[75] Inventors: Friedrich Icking, Oelde; Heinrich Bucker, Langenberg, both of Fed. Rep. of Germany

[73] Assignee: Westfalia Separator AG, Oelde, Fed. Rep. of Germany

[21] Appl. No.: 816,517

[22] Filed: Jan. 6, 1986

[30] Foreign Application Priority Data

Jan. 17, 1985 [DE] Fed. Rep. of Germany ....... 3501328

[51] Int. Cl.[4] ............................................. A01J 7/00
[52] U.S. Cl. ............................. 119/14.18; 119/14.03; 134/56 R
[58] Field of Search ............... 119/14.03, 14.08, 14.18; 134/56 R, 57 R

[56] References Cited

U.S. PATENT DOCUMENTS 2,680,445 6/1954 Hemminger ..................... 119/14.03
4,476,808 10/1984 Meermoller et al. ............ 119/14.18

FOREIGN PATENT DOCUMENTS 1271377 7/1961 France .............................. 119/14.18

*Primary Examiner*—William F. Pate, III
*Assistant Examiner*—R. Chilcot
*Attorney, Agent, or Firm*—Sprung Horn Kramer & Woods

[57] ABSTRACT

A device for cleaning a milking system, with an air separator, a rinse reservoir, a suction line that leads from the rinse reservoir to the air separator through a milking station, and a pressure line that leads from the air separator to the rinse reservoir. The top of the air separator communicates with a vacuum line and the bottom communicates with the pressure line through a conveyor pump and with a shut-off valve in the section of the suction line between the rinse reservoir and the milking station. To improve the cleaning effectiveness of the known device and prevent the air separator from getting overloaded, the shut-off valve is remote-controlled and is connected through a control line to controls that are also connected to the conveyor pump and to a level sensor in the air separator through other control lines. The controls close the valve when the pump is on and open it when the pump is off.

2 Claims, 1 Drawing Figure

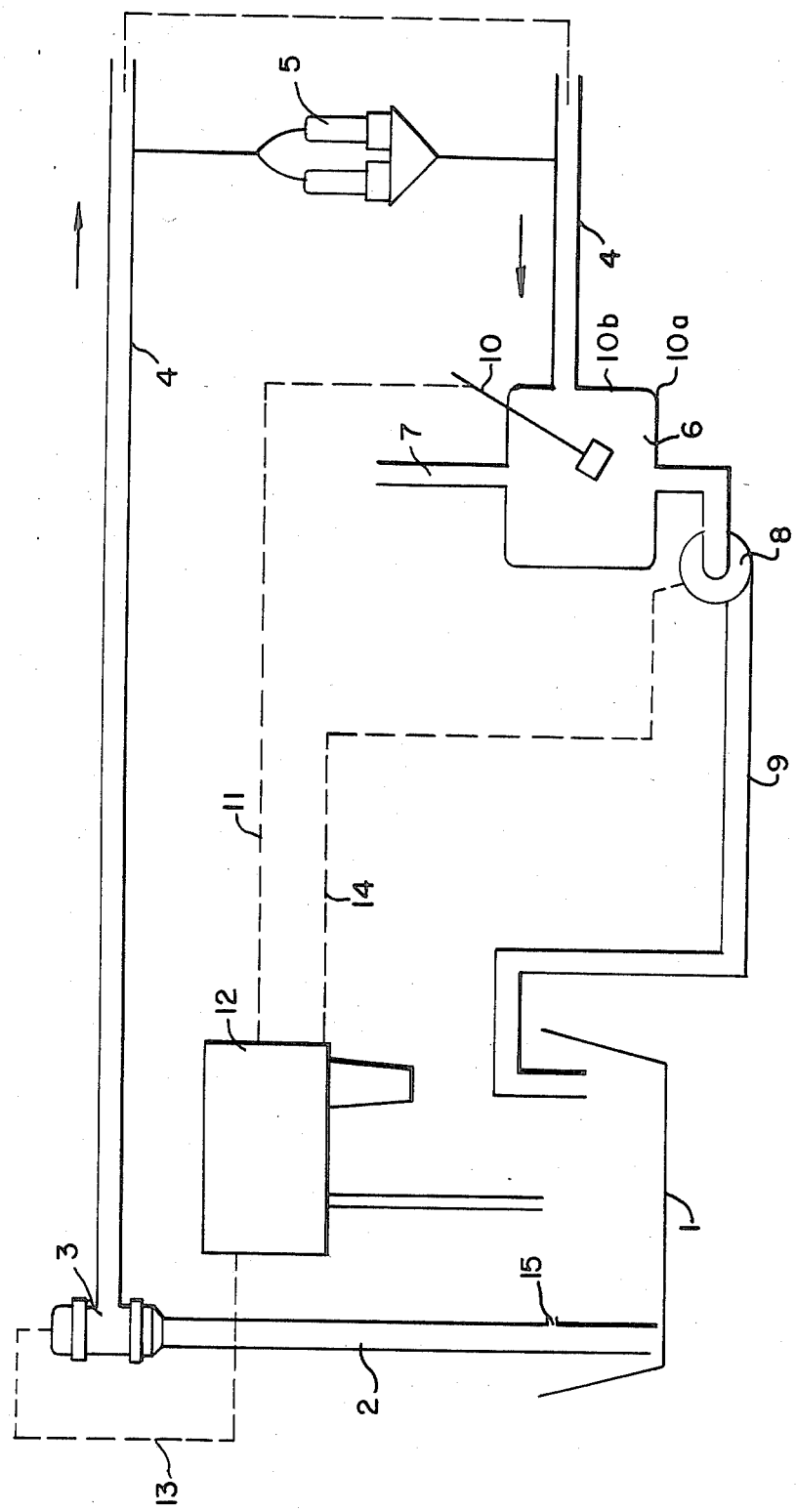

DEVICE FOR CLEANING A MILKING SYSTEM

BACKGROUND OF THE INVENTION

The present invention relates to a device for cleaning a milking system, with an air separator, a rinse reservoir, a suction line that leads from the rinse reservoir to the air separator through a milking station, and a pressure line that leads from the air separator to the rinse reservoir, with the top of the air separator communicating with a vacuum line and the bottom communicating with the pressure line through a conveyor pump and with a shut-off valve in the section of the suction line between the rinse reservoir and the milking station.

A device of this type is known, for example, from German Pat. No. 2 913 928. Rinsing is initiated at intervals, parallel to a suction line that extends into the rinse by means of an air-suctioning connection with an aperture that can be opened and closed with a valve that floats on the rinse. Rinse is suctioned through the suction line as long as the air-suctioning connection remains closed. When the level of rinse in the rinse reservoir drops, the air-suctioning connection is eventually released, and air is suctioned through the suction line until the reservoir fills up with rinse coming from the pressure line again and the valve closes the air-suctioning connection.

There are certain drawbacks to the known device. Admitting air into the suction line extensively decreases the vacuum in it, and the vacuum must be reestablished before suction can be initiated again. Thus, the next rinsing cycle cannot be commenced automatically. Also, the incoming air undesirably cools down the heated rinse to the detriment of effective cleaning. Furthermore, since the volume of rinse suctioned in per rinsing interval depends on the capacity of the rinse reservoir and how full it is, the air separator can become overloaded if the conveyor pump has too low an output to convey the intermittently occurring rinse volume rapidly enough.

SUMMARY OF THE INVENTION

The object of the present invention is to improve the cleaning effectiveness of the known device and prevent the air separator from getting overloaded.

This object is attained in accordance with the invention in that the shut-off valve is remote-controlled and is connected through a control line to controls which are also connected through other control lines to the conveyor pump and to a level sensor in the air separator and in that the controls close the valve when the pump is on and open it when the pump is off.

Since only small volumes of air are admitted to the suction line, the operating vacuum can be maintained and rinsing will commence automatically and lead to effective cleaning. Furthermore, the air will not cool the rinse. Again, rinse will be supplied to the air separator only until the level sensor arrives at its upper switching limit, upon which the controls will close the shut-off valve and turn on the conveyor pump. As soon as the air separator empties to the point where the level sensor arrives at its lower switching limit, the controls will turn off the pump and open the valve, and a new rinsing interval will commence. This procedure will be repeated in continuous alternation until the rinsing process is complete. Since the degree of fullness of the air separator can extend no higher than the upper level of the sensor no matter how much rinse it contains, it is impossible to overload the air separator.

The cleaning action can be augmented in a practical way if a calibrated air inlet is positioned in the suction-line section between the rinse reservoir and the shut-off valve. This causes the rinse to flow turbulently rather than laminarly and increases the cleaning action.

Some preferred embodiments of the invention will now be described with reference to the attached drawing, wherein

BRIEF DESCRIPTION OF THE DRAWING

The FIGURE is a schematic illustration of a device in accordance with the invention for cleaning a milking system.

DETAILED DESCRIPTION OF THE PREFERRED EMBODIMENTS

A rinse reservoir 1 communicates with an air separator 6 through a suction-line section 2, a shut-off valve 3, a suction line 4, and a milking machine 5. The top of air separator 6 communicates with a vacuum line 7 and the bottom communicates with rinse reservoir 1 through a conveyor pump 8 and a pressure line 9. There is a level sensor 10 in air separator 6 that informs controls 12 through a control line 11 how full the air separator is. Another control line 13 leads from controls 12 to shut-off valve 3, and a third control line 14 leads to conveyor pump 8.

As cleaning commences, air separator 6 is empty and the lower switching limit 10a of level sensor 10 is reached. Controls 12 keep shut-off valve 3 open and conveyor pump 8 off. Rinse is being suctioned into air separator 6 at high speed through suction-line section 2, shut-off valve 3, suction line 4, and milking machine 5. Cleaning action will be augmented even further by the turbulence generated as the air is supplied through calibrated air inlet 15. As soon as the liquid in air separator 6 rises to the upper limit 10b of level sensor 10, controls 12 will close shut-off valve 3 and turn conveyor pump 8 on, emptying air separator 6 down to the lower limit of the sensor before a new cycle commences. Suction line 4 will empty extensively even though no air can flow into it when shut-off valve 3 is closed because the milking machine 5 that it communicates with also has calibrated air inlets.

It will be appreciated that the instant specification and claims are set forth by way of illustration and not limitation, and that various modifications and changes may be made without departing from the spirit and scope of the present invention.

What is claimed is:

1. In a device for cleaning a milking station, having an air separator comprising a top and a bottom, a rinse reservoir, a suction line that leads from the rinse reservoir to the air separator through the milking station, and a pressure line that leads from the air separator to the rinse reservoir, wherein the top of the air separator communicates with a vacuum line and the bottom of the air separator communicates with the pressure line through a conveyor pump, the improvement comprising:

a remotely controllable shut-off valve in a section of the suction line between the rinse reservoir and the milking station, level sensing means in the air separator and control means connected through a first control line to the shut-off valve and connected through control lines to the conveyor pump and to the level sensing means for turning on the pump and closing the valve when an upper level is sensed in the air separator and for opening the valve and turning off the pump when a lower level is sensed in the air separator.

2. The device as in claim 1, further comprising a calibrated air inlet positioned in the suction-line section between the rinse reservoir and the shut-off valve.

* * * * *